(12) United States Patent
Price et al.

(10) Patent No.: US 11,972,539 B2
(45) Date of Patent: *Apr. 30, 2024

(54) GENERATE SUPER-RESOLUTION IMAGES FROM SPARSE COLOR INFORMATION

(71) Applicant: Microsoft Technology Licensing, LLC, Redmond, WA (US)

(72) Inventors: Raymond Kirk Price, Carnation, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,788

(22) Filed: Feb. 13, 2023

(65) Prior Publication Data

US 2023/0214962 A1 Jul. 6, 2023

Related U.S. Application Data

(63) Continuation of application No. 17/567,537, filed on Jan. 3, 2022, now Pat. No. 11,605,153.

(51) Int. Cl.
*G06T 3/40* (2006.01)
*G06T 3/4007* (2024.01)
(Continued)

(52) U.S. Cl.
CPC .......... *G06T 3/4061* (2013.01); *G06T 3/4007* (2013.01); *H04N 23/10* (2023.01); *H04N 23/951* (2023.01)

(58) Field of Classification Search
CPC ......... G06T 5/003; G06T 3/4053; G06T 5/50; G06T 2207/10024; G06T 2207/20201;
(Continued)

(56) References Cited

U.S. PATENT DOCUMENTS 7,483,058 B1 1/2009 Frank et al.
9,210,391 B1 12/2015 Mills
(Continued)

FOREIGN PATENT DOCUMENTS

CN 104769932 A 7/2015
DE 102014218460 A1 3/2016
WO 2021091608 A2 5/2021

OTHER PUBLICATIONS

"Notice of Allowance Issued in U.S. Appl. No. 17/567,537", dated Nov. 2, 2022, 12 Pages.
(Continued)

*Primary Examiner* — Twyler L Haskins
*Assistant Examiner* — Angel L Garces-Rivera
(74) *Attorney, Agent, or Firm* — Workman Nydegger

(57) ABSTRACT

Techniques for generating a high resolution full color output image from lower resolution sparse color input images are disclosed. A camera generates images. The camera's sensor has a sparse Bayer pattern. While the camera is generating the images, IMU data for each image is acquired. The IMU data indicates a corresponding pose the camera was in while the camera generated each image. The images and IMU data are fed into a motion model, which performs temporal filtering on the images and uses the IMU data to generate a red-only image, a green-only image, a blue-only image, and a monochrome image. The color images are up-sampled to match the resolution of the monochrome image. A high resolution output color image is generated by combining the up-sampled images and the monochrome image.

20 Claims, 13 Drawing Sheets

(51) Int. Cl.
*G06T 3/4061* (2024.01)
*H04N 23/10* (2023.01)
*H04N 23/951* (2023.01)

(58) Field of Classification Search
CPC . H04N 5/23232; H04N 5/265; H04N 9/04515
See application file for complete search history.

(56) References Cited

U.S. PATENT DOCUMENTS

| | | | |
|---|---|---|---|
| 10,212,339 | B2 | 2/2019 | Chen et al. |
| 10,277,844 | B2 | 4/2019 | Nishimura |
| 11,605,153 | B1* | 3/2023 | Price ..................... G06T 3/4015 |
| 11,676,250 | B1 | 6/2023 | Price |
| 2016/0037061 | A1 | 2/2016 | Lim et al. |
| 2016/0212332 | A1 | 7/2016 | Tang et al. |
| 2021/0374909 | A1 | 12/2021 | Chen et al. |
| 2023/0214965 | A1 | 7/2023 | Price et al. |
| 2023/0267577 | A1 | 8/2023 | Price et al. |

OTHER PUBLICATIONS

Jovanov, et al., "Joint Denoising, Demosaicing, and Chromatic Aberration Correction for UHD Video", In Proceedings of SPIE, Applications of Digital Image Processing, vol. 10396, Sep. 19, 2017, 10 Pages.

Luo, Gang, "A Novel Color Filter Array with 75% Transparent Elements", In Proceedings of SPIE, Digital Photography III, vol. 6502, Feb. 20, 2007, 8 Pages.

"International Search Report and Written Opinion Issued in PCT Application No. PCT/US2022/046328", dated Jan. 31, 2023, 14 Pages.

"Non Final Office Action Issued in U.S. Appl. No. 17/567,570", dated Oct. 28, 2022, 19 Pages.

"Notice of Allowance Issued in U.S. Appl. No. 17/567,570", dated Feb. 8, 2023, 11 Pages.

Farsiu, et al., "Video-to-Video Dynamic Super-Resolution for Grayscale and Color Sequences", In Journal of EURASIP on Advances in Signal Processing, Dec. 2006, 15 Pages.

Heinze, et al., "Joint Multi-Frame Demosaicing and Super-Resolution with Artificial Neural Networks", In Proceedings of 19th International Conference on Systems, Signals and Image Processing, Apr. 11, 2012, pp. 540-543.

"International Search Report and Written Opinion Issued in PCT Application No. PCT/US2022/054275", dated May 9, 2023, 10 Pages.

U.S. Appl. No. 17/567,537, filed Jan. 3, 2022.
U.S. Appl. No. 17/567,570, filed Jan. 3, 2022.
U.S. Appl. No. 18/142,418, filed May 2, 2023.
Non-Final Office Action mailed on Dec. 21, 2023, in U.S. Appl. No. 18/142,418, 15 pages.

* cited by examiner

GENERATE SUPER-RESOLUTION IMAGES FROM SPARSE COLOR INFORMATION

CROSS-REFERENCE TO RELATED APPLICATIONS

This application is a continuation of U.S. patent application Ser. No. 17/567,537 filed on Jan. 3, 2022, entitled "Generate Super-Resolution Images From Sparse Color Information," which application is expressly incorporated herein by reference in its entirety.

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system may also employ different types of cameras in order to display content to users, such as in the form of a passthrough image. A passthrough image or view can aid users in avoiding disorientation and/or safety hazards when transitioning into and/or navigating within an MR environment. An MR system can present views captured by cameras in a variety of ways. The process of using images captured by world-facing cameras to provide views of a real-world environment creates many challenges, however.

To improve the quality of the images that are displayed to a user, some MR systems perform what is called "temporal filtering." Temporal filtering refers to the process by which the system combines data that is captured over multiple timepoints in order to generate a particular output. In other words, the system essentially stacks multiple images on top of one another and combines them in a manner so as to produce an aggregated image having an improved quality.

For instance, in the MR system scenario, the system combines image data of consecutively captured images in order to generate an improved output. As an example, consider a low light scenario. Because of the low light, each individual image might be capable of providing only a limited amount of image data. By combining the data from multiple consecutively captured images, however, the system (e.g., by combining the data from all of those images via temporal filtering) can produce a suitable output image. In this sense, the process of temporal filtering involves capturing multiple image frames over a period of time and then combining the image data from those frames to produce an output frame, resulting in a scenario where the output frame is actually an aggregation of multiple input frames.

Various challenges occur when performing temporal filtering, however. For example, so-called "ghosting effects" can result if an object in the scene or environment is moving while the system captures the multiple consecutive images. More particularly, ghosting occurs when an object or image artifact has a trail of pixels that follow the object (e.g., a form of motion blur). This trail of pixels occurs because the object is at different locations while the multiple consecutive images are being generated, and those different locations are then reflected in the final composite image.

Another challenge occurs when the camera itself undergoes movement while it is generating the images. Movements of the camera can also skew the temporal filtering process. It may be the case that the camera is moving in non-MR system scenarios, such as perhaps in vehicles. Accordingly, there are other technical areas where these challenges occur. Yet another challenge relates to the quality or resolution of the final output image. In view of these challenges, as well as others, there is a substantial need to improve the temporal filtering process.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for generating a high resolution full color output image from lower resolution sparse color input images.

In some embodiments, a camera generates images. A sensor of the camera is configured to have a sparse Bayer pattern comprising one or more red pixels, one or more green pixels, one or more blue pixels, and a plurality of monochrome pixels. While the camera is generating the images, the embodiments acquire corresponding IMU data for each of the images. The IMU data indicates a corresponding pose the camera was in while the camera generated each image. The images and the IMU data are fed as input into a motion model. The motion model performs temporal filtering on the images and uses the IMU data to generate a red-only image, a green-only image, a blue-only image, and a monochrome image. The embodiments up-sample the red-only image, the green-only image, and the blue-only image to cause a first resolution of the red-only image, a second resolution of the green-only image, and a third resolution of the blue-only image to match a fourth resolution of the monochrome image. A high resolution output color image is generated by combining the up-sampled red-only image, the up-sampled green-only image, the up-sampled blue-only image, and the monochrome image.

In some embodiments, supplemental information can be acquired, where this supplemental information reflects the camera's poses. This supplemental information can be fed as input along with the images into the motion model.

In some embodiments, the motion model is configured to generate the red-only image by isolating red pixels included in the images from non-red pixels and by populating the red-only image with the red pixels by placing each respective red pixel at a corresponding red-only image coordinate within the red-only image. The corresponding red-only image coordinate is determined using the IMU data. The motion model is further configured to generate the green-only image by isolating green pixels included in the images from non-green pixels and by populating the green-only image with the green pixels by placing each respective green pixel at a corresponding green-only image coordinate within the green-only image. The corresponding green-only image coordinate is determined using the IMU data. The motion model is further configured to generate the blue-only image by isolating blue pixels included in the images from non-blue pixels and by populating the blue-only image with the blue pixels by placing each respective blue pixel at a corresponding blue-only image coordinate within the blue-only image. The corresponding blue-only image coordinate is determined using the IMU data. The motion model is further configured to generate the monochrome image by isolating monochrome pixels included in the images from non-monochrome pixels and by populating the monochrome image with the monochrome pixels by placing each respective monochrome pixel at a corresponding monochrome image coordinate within the monochrome image. The corresponding monochrome image coordinate is determined using the IMU data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
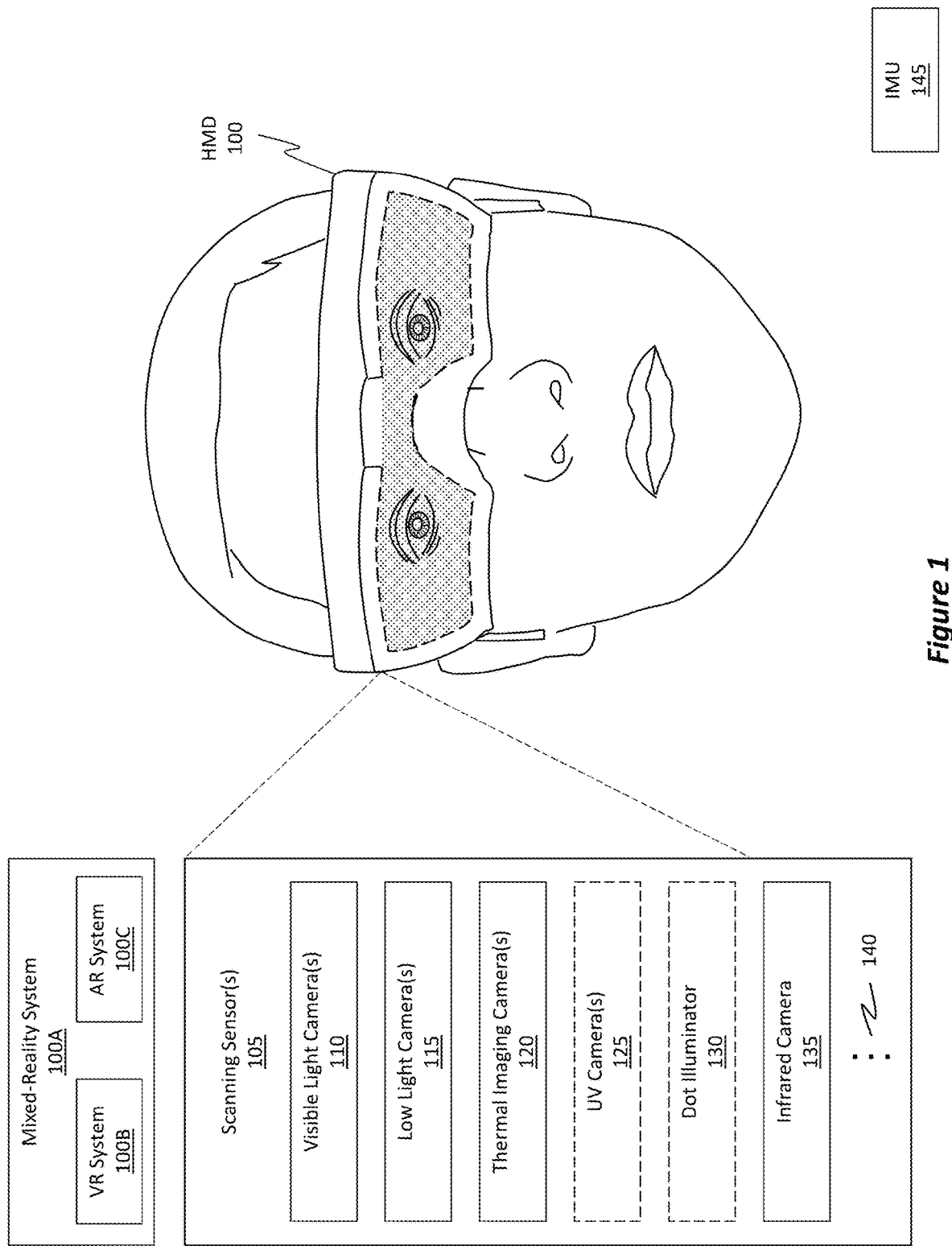
FIG. 1 illustrates an example of an HMD.

Embodiments disclosed herein relate to systems, devices, and methods for generating a high resolution full color output image from lower resolution sparse color input images.

In some embodiments, a camera generates images. A sensor of the camera is configured to have a sparse Bayer pattern comprising one or more red pixels, one or more green pixels, one or more blue pixels, and a plurality of monochrome pixels. While the camera is generating the images, the embodiments acquire corresponding IMU data for each of the images. The IMU data indicates a corresponding pose the camera was in while the camera generated each image. The images and the IMU data are fed as input into a motion model. The motion model performs temporal filtering on the images and uses the IMU data to generate a red-only image, a green-only image, a blue-only image, and a monochrome image. The embodiments up-sample the red-only image, the green-only image, and the blue-only image to cause a first resolution of the red-only image, a second resolution of the green-only image, and a third resolution of the blue-only image to match a fourth resolution of the monochrome image. A high resolution output color image is generated by combining the up-sampled red-only image, the up-sampled green-only image, the up-sampled blue-only image, and the monochrome image.

As used herein, "super resolution" refers to any resolution that includes or is higher than full HD. As used herein, "sparse resolution" refers to any resolution that includes or is lower than SXGA.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field. That is, the embodiments provide improvements to the technical field of temporal filtering and generating images. For instance, the disclosed embodiments provide for the ability for a system to operate in sub-optimal conditions, such as low light conditions, yet still be able to produce high resolution full color output images. To illustrate, the disclosed principles can be practiced in low luminance environments where the camera sensors might possibly detect less than 1 photon per image frame (aka image). Despite these sub-par conditions, the embodiments beneficially achieve improved output signals by temporally combining multiple frames together.

The embodiments also beneficially reduce or entirely eliminate ghosting effects, which might otherwise occur in traditional systems when objects in the scene are moving. The principles can also be implemented even where there are high levels of noise in the generated images, or when there is a low signal to noise ratio for the imagery. That is, the principles can be practiced in a broad range of conditions.

The embodiments use a camera sensor having a sparse Bayer pattern in a new and unique manner in order to generate a high resolution full color output image. To do so, the embodiments utilize a motion model to isolate red, green, blue, and texture pixel data from the initial camera images. The motion model then generates respective red-only, green-only, and blue-only color images as well as a high resolution texture map (i.e. a monochrome image). The respective single-color images are generated using a temporal filtering process in which pixel data from multiple images is extracted and aggregated together.

Notably, because the camera moved while the camera was generating the various images, different portions of the environment are represented or "covered" in the images using the isolated color data. For instance, at one point in time, a red pixel "covers" a first part of the environment while at a second point in time, the red pixel "covers" a second part of the environment. Over time, a large majority of the environment will eventually be "covered" using the red pixel due to the movement of the camera. The embodiments aggregate the red pixel data, which was collected over time, to generate the red-only image. Similar operations are performed for the green-only image, the blue-only image, and the monochrome/grayscale image. The resulting images can be higher resolution than the initial camera images.

With these images and map, the embodiments can then beneficially combine those images and map in a manner so as to generate a high resolution full color output image. Beneficially, the disclosed principles can be practiced in other, non-MR system scenarios, such as perhaps in the context of a Accordingly, these and numerous other benefits will now be described throughout the remaining portions of this disclosure.

Example MR Systems And HMDs

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed. A passthrough image can be generated as a result of performing temporal filtering on multiple consecutively generated images.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially ultraviolet (UV) camera(s) 125, potentially a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

In some embodiments, the visible light camera(s) 110 and the low light camera(s) 115 (aka low light night vision cameras) operate in approximately the same overlapping wavelength range. In some cases, this overlapping wavelength range is between about 400 nanometers and about 1,100 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 110 are low power cameras and operate in environments where the illuminance is between about 10 lux and about 100,000 lux, or rather, the illuminance range begins at about 10 lux and increases beyond 10 lux. In contrast, the low light camera(s) 115 consume more power and operate in environments where the illuminance range is between about 110 micro-lux and about 10 lux.

The thermal imaging camera(s) 120, on the other hand, are structured to detect electromagnetic radiation or IR light in the far-IR (i.e. thermal-IR) range, though some embodiments also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. These wavelengths are also included in the light spectrum(s). Because the thermal imaging camera(s) 120 detect far-IR radiation, the thermal imaging camera(s) 120 can operate in any illuminance condition, without restriction.

The HMD 100 can also be equipped with an inertial measurement unit (IMU), as shown by IMU 145. The IMU 145 measures forces, angular rates, and orientation using a combination of accelerometers, gyroscopes, and magnetometers. The IMU 145 produces IMU data, which can be used by the disclose embodiments.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

The disclosed embodiments may be structured to utilize numerous different camera modalities. The different camera modalities include, but are not limited to, visible light or monochrome cameras, low light cameras, thermal imaging cameras, and UV cameras.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

In some scenarios, noise may be present in one of the images. For instance, in very low light conditions (e.g., 1.0 millilux or "starlight" environments), there might not be enough light photons in the environment for the low light camera to generate a high quality image. Indeed, the resulting image generated by the low light camera may be heavily corrupted with noise. When such conditions occur, the embodiments are beneficially able to perform temporal filtering. More details on temporal filtering will be provided shortly.

By way of reference, however, it is beneficial to note the general illuminance metrics for different scenarios. For instance, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, a so-called "low light environment" at least corresponds to any environment in which the ambient light intensity is at or below about 40 lux. The HMD has one or more sensors that are configured to determine the surrounding environment lux intensity. These sensors can be incorporated into or independent from the cameras and/or illuminators described herein.

When used in a very low light environment (e.g., about 1.0 millilux or "starlight" environments), the low light camera sensors attempt to compensate for the low light condition by ramping up the camera's gain (e.g., digital gain, analog gain, or a combination of digital and analog gain). As a result of ramping up the camera sensor's gain, the resulting image can be very noisy. In an effort to improve the quality of the images, the embodiments perform temporal filtering.

Temporal Filtering

Figure 2:
FIG. 2 illustrates how the HMD can generate an image and how, in some cases, that image might be noisy.
Figure 3:
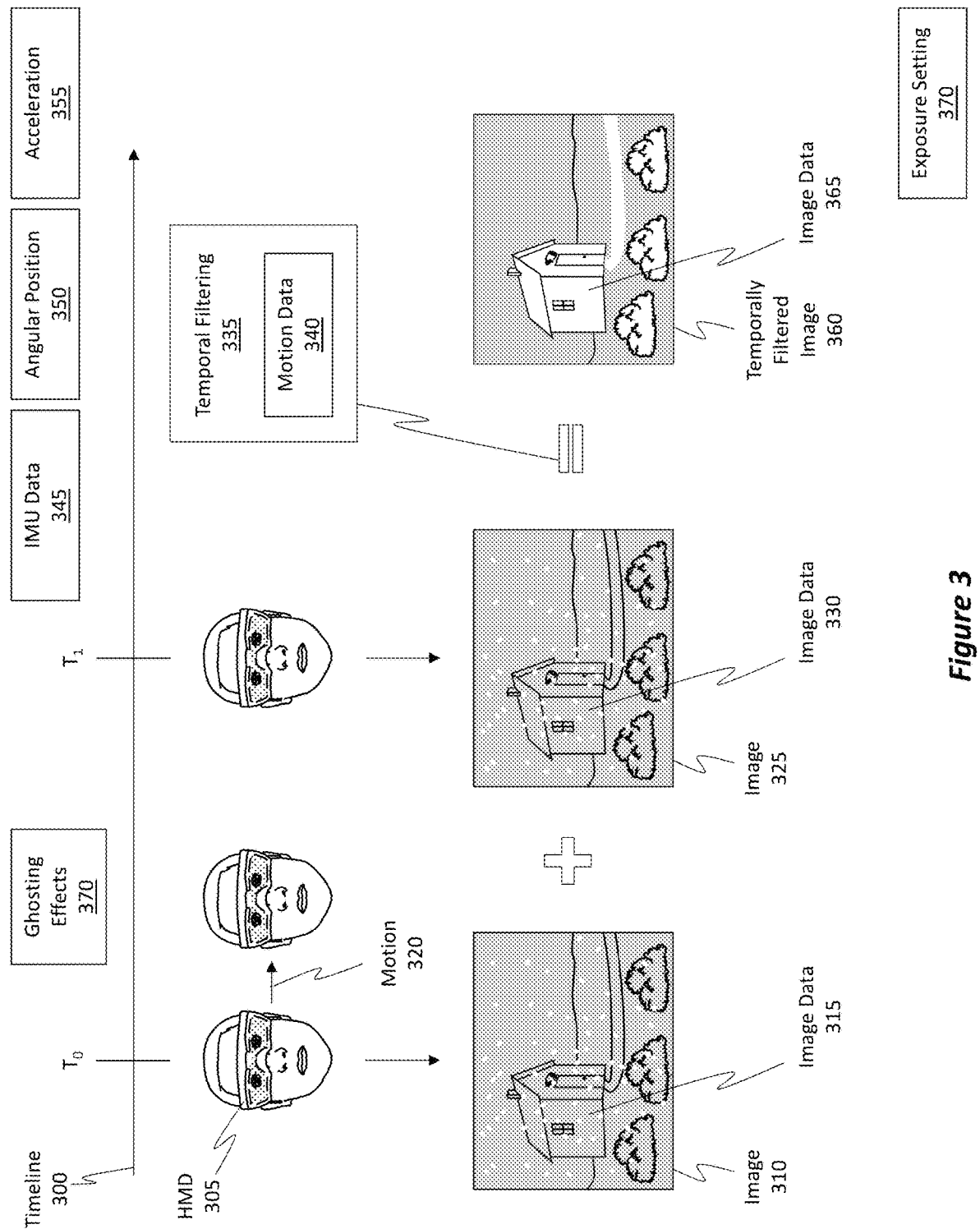
FIG. 3 illustrates an example timeline illustrating how temporal filtering is performed.

FIG. 2 shows an HMD 200, which is representative of the HMD 100 of FIG. 1. HMD 200 has generated an image 205 in a low light environment 210. As shown, the image 205 includes various different image data 215. Because the image 205 was generated in a low light scenario, however, there is a significant amount of noise 220 (e.g., the white dots throughout the image 205). If used by itself, the image 205 would provide a generally poor quality image for presentation to a user. With that understanding, then, the embodiments are configured to perform temporal filtering. FIG. 3 provides some useful details.

FIG. 3 shows a timeline 300. At time $T_0$, an HMD 305 (which is representative of the HMDs discussed thus far) generates an image 310 that includes image data 315. Similar to the scenario presented in FIG. 2, the image 310 was generated in a low light environment. FIG. 3 also notes how, subsequent to time $T_0$, the HMD undergoes some amount of motion 320 or movement.

At time $T_1$, the HMD 305 then generates a second image 325, which includes image data 330. In accordance with the disclosed principles, the embodiments are able to use image 310 and image 325 to perform a temporal filtering 335 operation. The embodiments can also use motion data 340 generated by an IMU to compensate for the motion 320 that occurred between time $T_0$ and $T_1$. That is, the embodiments can acquire IMU data 345, which details the angular position 350 and the acceleration 355 of the camera that generated the images 310 and 325. The angular position 350 details the orientation of the camera using a three degrees of freedom (DOF) basis, while the acceleration 355 details whether the camera is translating or moving.

A motion compensation operation generally involves modifying one pose to match a different pose. The different pose might be a predicted pose based on the motion data 340. As an example, image 310 reflected or embodied a first pose of the HMD 305 at time $T_0$. The HMD 305 then shifted to a new position or pose, as shown by motion 320. The IMU captured the movement of the HMD 305 between time $T_0$ and $T_1$. The HMD 305 can use the IMU data to predict a new pose of the HMD 305 at time $T_1$ (or perhaps even a later time). Based on this prediction, the HMD 305 can then perform a motion compensation operation to transform the pose embodied in image 310 to reflect the predicted pose of the HMD 305 (as it will be at time $T_1$). At time $T_1$, the HMD 305 generates the image 325. The embodiments are able to compare the motion compensated pose (which was designed in an attempt to reflect the HMD 305's pose at time $T_1$) with the actual pose of the HMD 305 at time $T_1$. The level or amount of difference between those two poses reflects the accuracy of the motion compensation. If there is no difference, then the motion compensation operation was 100% successful. On the other hand, the larger the amount of difference, the worse the motion compensation performed. Measuring or comparing the differences is primarily performed by comparing each pixel's intensity level with one another. That is, a first pixel in the motion compensated image is identified, and a corresponding pixel in the image 325 is identified. The intensity levels for these two pixels are compared against one another. The resulting difference between those two values reflects the accuracy of the motion compensation operation.

Performing motion compensation is desirable because of the temporal filtering process. Recall, the temporal filtering process essentially stacks multiple images on top of one another and combines the data from those images to generate an enhanced image. For the stacking to work properly, the poses in each of those different images should align with one another. Thus, the motion compensation operation is performed in order to align the various different poses for the various different images.

As a result of performing the temporal filtering 335 operation, the embodiments are able to generate a temporally filtered image 360 that has improved or enhanced image data 365 as compared to the image data 315 and 330 of the previous images. Additionally, as will be described momentarily, not only do the embodiments beneficially compensate for motions of the camera, but the embodiments also beneficially reduce the impact of ghosting effects 370 for objects that are moving in the scene. Notably, in some embodiments, an exposure setting 370 of the camera remains unchanged while the camera generates the images.

Bayer Pattern Characteristics

Figure 4:
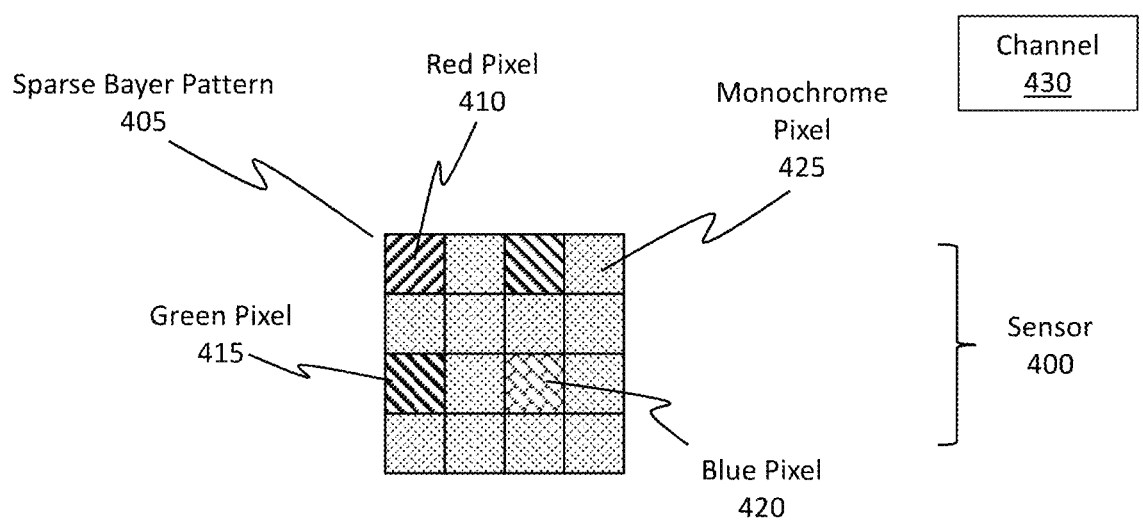
FIG. 4 illustrates one example of a camera sensor having a sparse Bayer pattern.

FIG. 4 shows an example camera sensor 400, which can be implemented in any of the cameras mentioned thus far. This sensor 400 is configured to have a sparse Bayer pattern 405. By "sparse," it is meant that multiple different monochrome (i.e. grayscale) pixels are interweaved between various red, green, and blue pixels. To illustrate, the sparse Bayer pattern 405 includes a red pixel 410, a green pixel 415 (two green pixels are present, but only one is labeled), and a blue pixel 420. The sparse Bayer pattern 405 further includes multiple different monochrome pixels, as shown by monochrome pixel 425. In this example illustration, the sensor 400 has 16 pixels. Here, one pixel is a red pixel, two pixels are green pixels, one pixel is a blue pixel, and 12 pixels are monochrome.

The embodiments are able to isolate the color data from the different pixels using different channels per pixel, as shown by channel 430. That is, one channel (e.g., a red sensor channel) can be used to isolate the red pixel data, another channel (e.g., a green sensor channel) can be used to isolate the green pixel data, a different channel (e.g., a blue sensor channel) can be used to isolate the blue pixel data, and yet a different channel (e.g., a monochrome sensor channel) can be used to isolate the monochrome pixel data.

Figure 5:
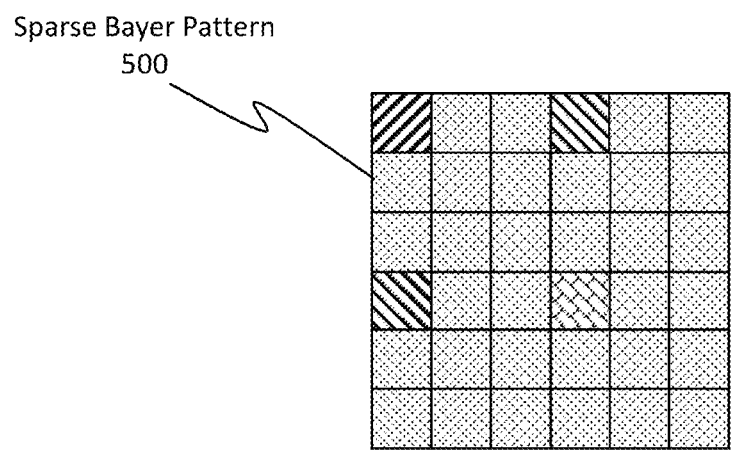
FIG. 5 illustrates another example of a camera sensor having a sparse Bayer pattern.

FIG. 5 shows another example implementation of a sparse Bayer pattern 500. From this illustration, one will appreciate how the configuration and layout of the sparse Bayer pattern can be designed to fit various different criteria. Generally, however, to be "sparse," the Bayer pattern is configured to have various monochrome pixels interweaved among red, green, and blue pixels.

In the above example, the pattern included one red pixel, two green pixels, and one blue pixel, but other numbers can be used as well. For instance, it might be the case that there are two red pixels, one green pixel, and one blue pixel, or, alternatively, one red pixel, one green pixel, and two blue pixels. With a larger grid layout (e.g., perhaps 5×5 or 6×6), the patterns can include multiple red pixels, multiple green pixels, and multiple blue pixels.

Figure 6:
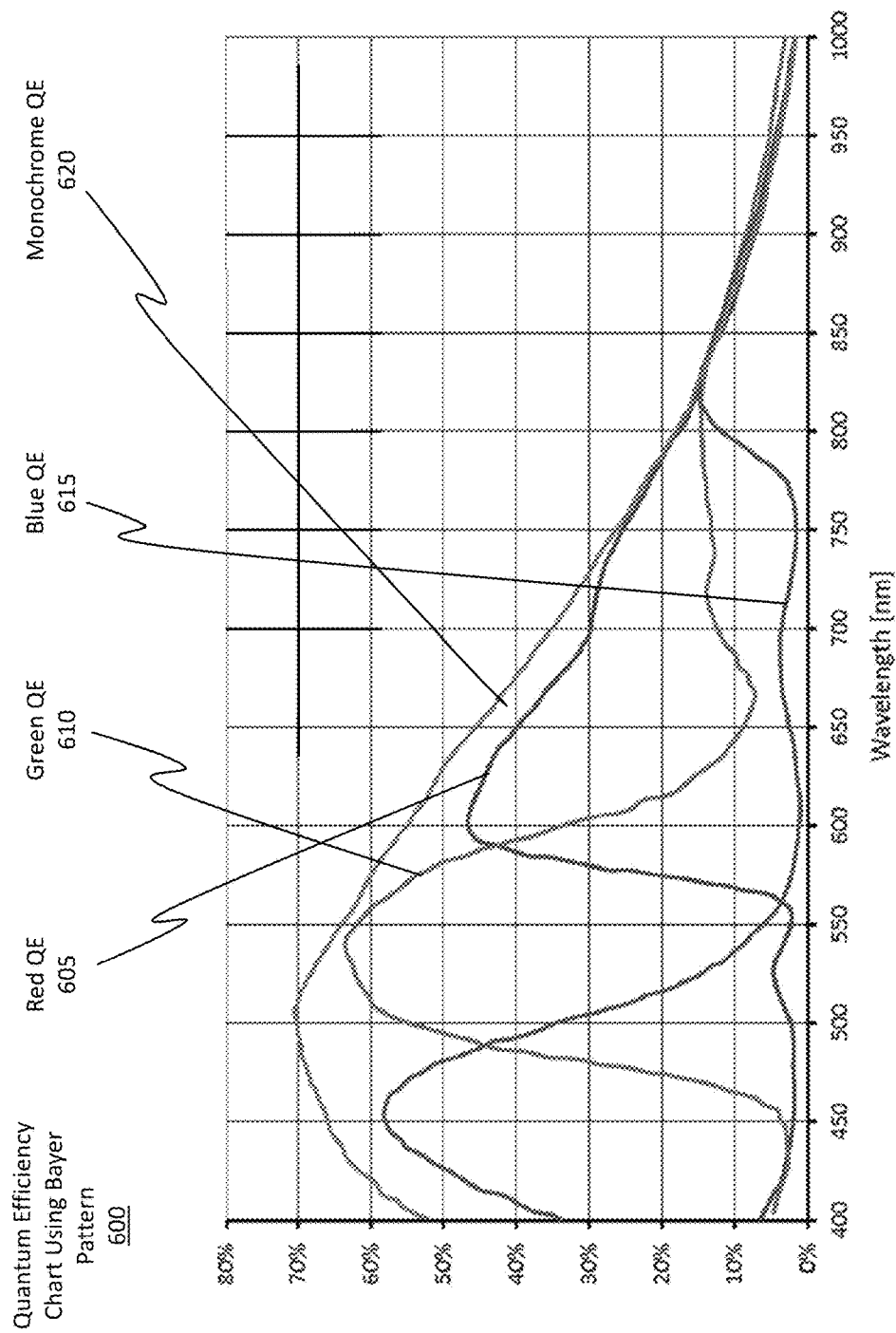
FIG. 6 illustrates various curves showing the quantum efficiencies of a sensor having a Bayer pattern.

FIG. 6 shows an example chart, which is labeled quantum efficiency chart using Bayer pattern 600. As the name suggests, this chart outlines the quantum efficiencies (QE) for the red, green, blue, and monochrome pixels of the sensor having the Bayer pattern. To illustrate, the chart includes the red QE 605, the green QE 610, the blue QE 615, and the monochrome QE 620. Notice, the curve for the monochrome QE 620 is more expansive than any of the other curves. Generally, when a Bayer pattern is used, about half of the optical power or half of the incident photons are lost because of the color filters used as a part of the Bayer pattern (i.e. a loss in color generation fidelity). One of the benefits provided by the disclosed principles relates to the ability to collect more photons over time in order to build up a higher resolution and more intense full color output image. In this sense, the embodiments beneficially use a camera sensor having a sparse Bayer pattern in a new and unique manner in order to generate a high resolution full color image.

Building Up an Image

Figure 7:
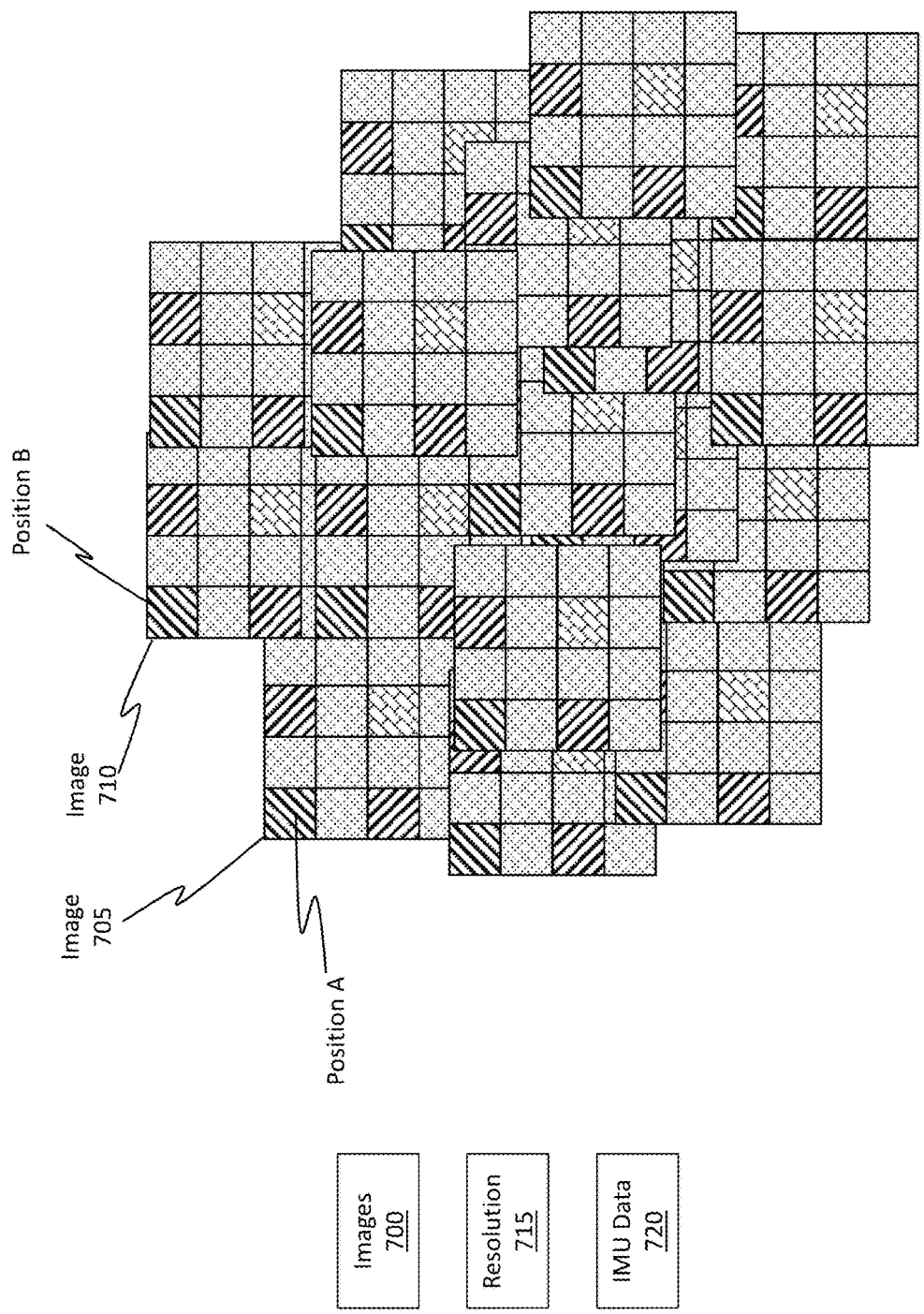
FIG. 7 illustrates how images can be generated over time, where the camera can shift somewhat between each image capture.

Attention will now be directed to FIG. 7, which illustrates a compilation of images 700, such as image 705 and image 710. Each of the images was generated using the Bayer pattern mentioned earlier. That is, in accordance with the disclosed principles, the embodiments are able to use the previously described sensor (e.g., sensor 400 from FIG. 4) to generate multiple images over at least a period of time. This period of time can be any time period, without limit, provided that multiple images are generated during that time period.

By way of further clarification, at one point in time, the sensor is positioned at Position A and generates the image 705 (in this simplified example, the image is a 4×4 pixel image). At a different point in time, the same sensor is at Position B and generates the image 710. FIG. 7 shows how multiple different images can be generated over a period of time and how the sensor can be positioned at different locations during that time period. Based on the configuration of the sensor, the images will have a particular resolution 715 (e.g., perhaps a VGA 640×480 resolution).

The embodiments are able to track the various positions of the sensor while the sensor is generating the images. In some cases, the tracking process is performed using inertial measurement unit (IMU) data 720. That is, the IMU data 720 tracks and monitors the various positions of the sensor, such as Position A and Position B at their respective times, or timestamps. As will be described later, image correspondences or feature matching can also be performed to track the position of the sensor over time.

If multiple pixels "cover" the same area of the environment over time, the embodiments can perform a number of operations. For instance, in some cases, the embodiments might elect to use the most recent version of the pixel data and might discard the old or stale version of the pixel data. In some cases, the embodiments might perform an intensity comparison between the older and the newer pixels. If there is a discrepancy between the two pixels, then it might be the case that an object in the environment has moved (which could cause ghosting effects). The embodiments can then analyze the entire image to determine whether an object has moved. If one of the pixels reflects a scenario where there is no object while the other pixel reflects a scenario where there is an object present, then the embodiments can elect to use the former pixel, thereby eliminating possible ghosting effects.

In one scenario, pixels that represent (or "cover") the same area of the environment can be given different weights. These weights can be assigned using a bilateral weight computation. For instance, a difference in intensity between the pixels can be computed. Then, a function can be defined that converts the difference to a weight, where the function is based on a negative exponential. Larger differences result in a smaller weight while smaller differences result in a higher weight. The weights can be used to determine the influence each pixel has when combining the pixel data to create subsequent images (i.e. so-called red-only, green-only, blue-only, or even monochrome images).

The embodiments are able to isolate the different color data from one another. That is, the red pixel color data can be isolated from the green, blue, and monochrome color data. As will be described in more detail later, this isolation is performed using different color channels for the different pixels as well as using a motion model to interpret the data.

Figure 8:
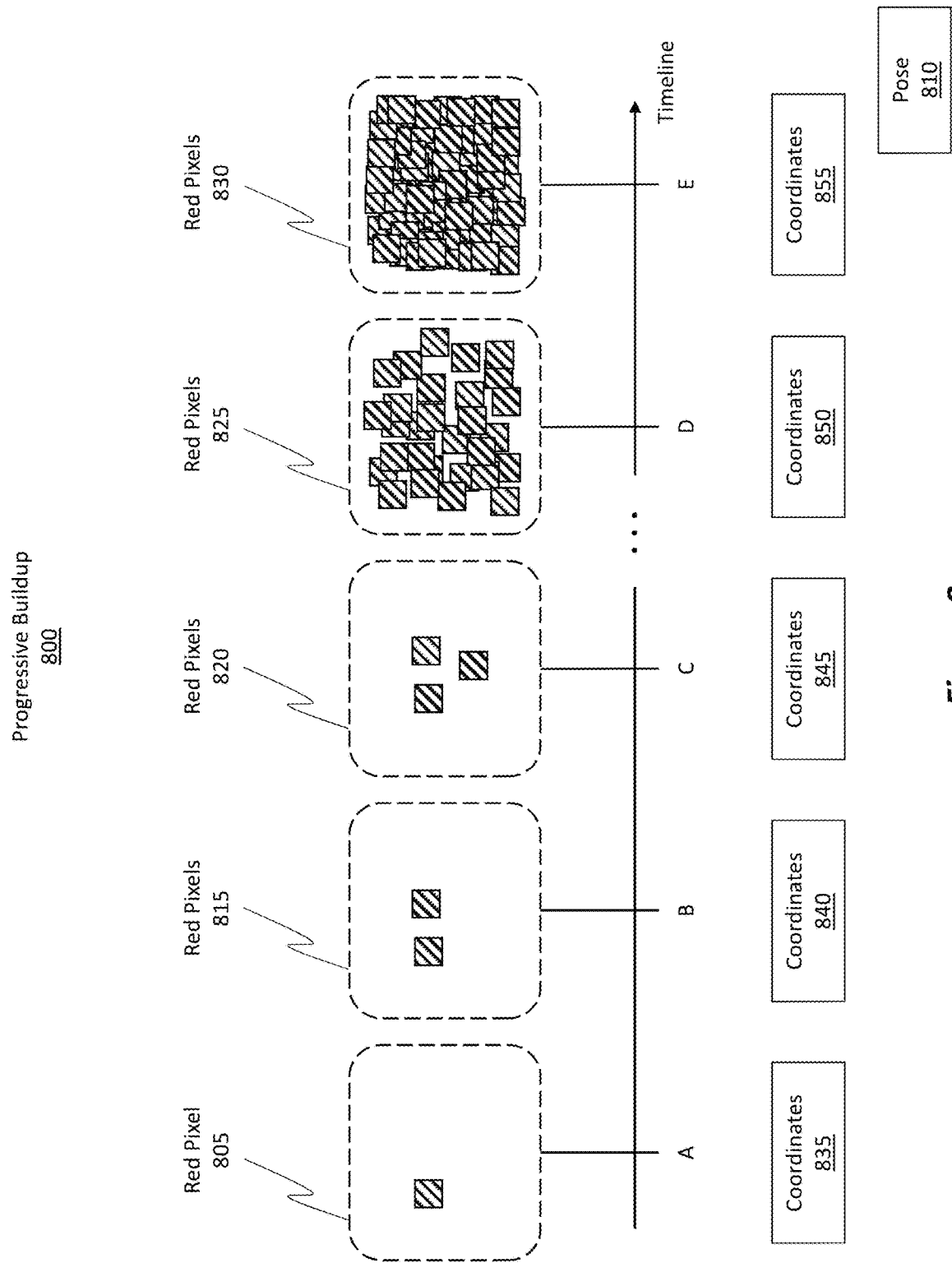
FIG. 8 illustrates an example process in which pixel data is progressively collected or built up over time.

FIG. 8 shows a progressive buildup 800 process, where image data is collected over time. By progressively collecting color data over a period of time, the embodiments can then stack that color data (i.e. perform temporal filtering) and effectively "build" a resulting image based on the individually collected (over time) pixel data. That image is built by performing the motion compensation operation described earlier. Specifically, IMU (or other supplemental information) is acquired in order to determine the differences in pose from one image to another. The poses can be aligned using the motion compensation operation. With the aligned data, color information can then be "filled in" in order to generate an image.

To illustrate, FIG. 8 shows a first instance in time (i.e. time "A"). At time A, the camera generated an image using a sensor having a sparse Bayer pattern. Here, the discussion will focus only on the red pixel data, but one will appreciate how the principles equally apply for the green, blue, and monochrome pixels. Using the sparse Bayer pattern, an image is generated and there is (at this point in time) data for a single red pixel 805. The embodiments are able to use an IMU to track the position or pose 810 of the camera. The embodiments are also able to store the information related to the red pixel 805.

At time "B," another image is generated. In this example scenario, the camera has slightly shifted in position, and the position of the red pixel is now slightly to the right of where it was previously. With the IMU data, motion compensation can be performed to determine the relative locations between the two pixels. Now, the embodiments have data for two red pixels 815. That is, the same sensor pixel generated the data at both times, but the embodiments are able to track the data over time, resulting in a scenario where now there are multiple units of data.

At time "C," the camera has again shifted position, and the camera has again generated another image and again determined the relative locations of the pixels. Now, the embodiments have data for three different red pixels 820.

Later, at time "D," the camera has shifted numerous times and numerous different images have been generated. From FIG. 8, one can observe how an entire image is being "filled in" with red pixel data over a period of time. The red pixels 825 illustrate this progressive buildup of color data.

Even later, at time "E," the camera has shifted many times and many different images have been generated. Now, it is the case that an entire image can be populated with pixel data that has been collected over time using the motion compensated temporal filtering process described earlier (but based on individualized pixel data, such as all red pixel data from a particular image). The red pixels 830 illustrate this progressive buildup of color data over time.

By tracking the pose 810 information for the camera for each of the images, the embodiments can generate a resulting image and can populate a particular pixel in that resulting image with the acquired pixel information. Notably, the embodiments can determine which coordinates to place the pixel in the resulting image based on the pose 810 information previously acquired and based on an analysis (i.e. the motion compensation operation) performed by a motion model, which will be described shortly. FIG. 8 illustrates how the embodiments can determine coordinates 835 for the red pixel 805 based on the pose information. Similarly, other coordinates (e.g., coordinates 840, 845, 850, and 855) can be determined for the other pixels. These coordinates indicate where in the resulting image the red pixel data will be placed.

Using a Motion Model to Generate Images

Figure 9:
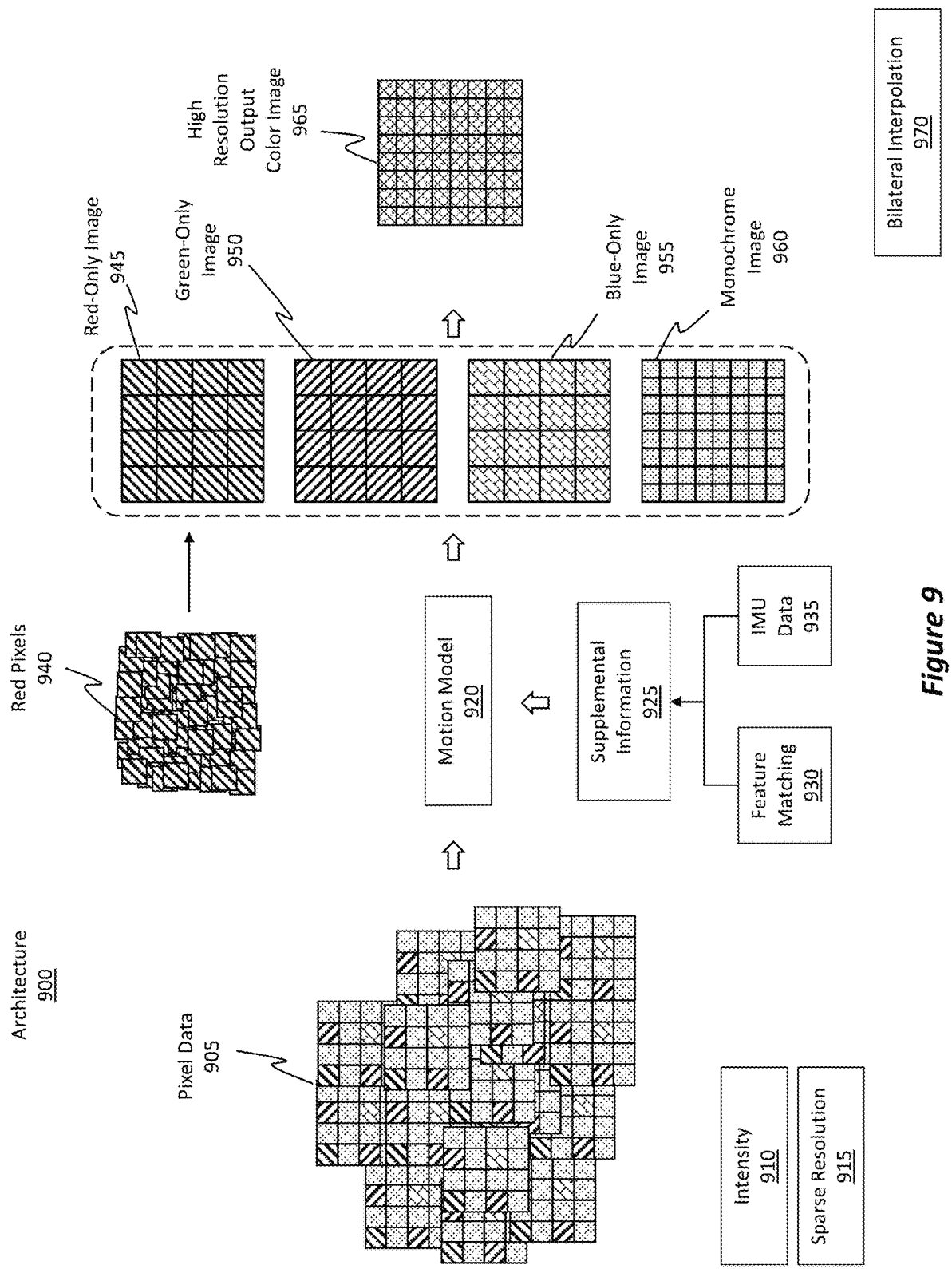
FIG. 9 illustrates an example architecture that may be used to generate a high resolution output color image.

FIG. 9 shows an example architecture 900 that may be used to generate a high resolution full color output image from lower resolution sparse color input images. Initially, a set of pixel data 905 is acquired using the processes outlined earlier. This pixel data 905 includes intensity 910 information for the pixels (e.g., from the monochrome pixels), and the images that generated the pixel data 905 have a sparse resolution 915 (e.g., perhaps VGA 640×480 resolution). The sparseness of the color data or resolution may be due to sub-optimal lighting conditions, such as perhaps low light conditions.

The pixel data 905 is fed as input into a motion model 920. In addition to the pixel data 905, supplemental information 925 is also fed as input into the motion model 920. This supplemental information 925 can include feature matching 930 data (i.e. image correspondences) or IMU data 935.

The feature matching 930 data uses matches between feature points (aka image correspondences) to align the various images that were generated (e.g., the pixel data 905). In other words, the embodiments can identify image correspondences between the various different images. Those image correspondences can then be used to determine how to align the various images with one another using the motion model 920. When the feature matching 930 is used, it may be the case that the motion model 920 is a homography motion model, a similarity transform motion model, or perhaps an affine motion model.

On the other hand, the IMU data 935 can also be used to determine how to align the various images, or rather, to determine what the relative positioning of the pixel data is to one another. When the IMU data 935 is used, the motion model 920 can be any type of three-dimensional rotational motion model.

In any event, the supplemental information 925 is used by the motion model 920 to identify relative alignments between the various images that generated the pixel data 905. The pixel data 905 is fed into the motion model 920 using different channels for the different pixel types (e.g., red, green, blue, monochrome), and the motion model 920 is able to analyze the incoming information in order to isolate the pixel data from one another.

That is, using the incoming information, the motion model 920 is able to isolate and store all of the red pixels (e.g., red pixel 940) from all of the non-red pixels. The motion model 920 is able to isolate and store all of the green pixels from all of the non-green pixels. The motion model 920 is able to isolate and store all of the blue pixels from all of the non-blue pixels. Similarly, the motion model 920 is able to isolate and store all of the monochrome pixels from all of the non-monochrome pixels.

FIG. 9 shows one example of the above isolation process. For instance, the motion model 920 is able to analyze the pixel data 905 and the supplemental information 925 to identify the red pixels 940. Based on the red pixels 940, the motion model 920 can then generate a red-only image 945.

Notably, the pixel data in that image is arranged relative to one another based on the supplemental information 925, which was used by the motion model 920 to determine the relative positioning of the red pixel data relative to one another. By way of further clarification, the motion model 920 used the supplemental information 925 to determine a first image coordinate for a first red pixel in the red-only image 945. The motion model 920 used the supplemental information 925 to determine a second image coordinate for a second red pixel in the red-only image 945. The motion model 920 determined placement locations (i.e. image coordinates) for all of the red pixels 940, where that placement location indicated where in the red-only image 945 any particular one red pixel will be placed.

Similar operations are performed to generate a green-only image 950, a blue-only image 955, and a monochrome image 960 (aka a high resolution texture map). These respective images represent motion compensated (i.e. aligned) stacked versions of the pixel data that has been collected. Stated differently, these respective images are composites of all the respective color information that has been collected, and that color information is aligned relative to one another via the motion model 920 using the supplemental information 925.

Notice, the resolution of the monochrome image 960 is higher (i.e. as represented by the increased number of "boxes") than the resolutions of the other images. The monochrome image 960 has a higher resolution because there are a higher number of monochrome pixels than any other pixels. Consequently, more monochrome data (i.e. texture data) is acquired as compared to the amount of the color data. Further details on this aspect will be provided later.

In some cases, the red, green, and blue-only images might also have higher resolutions than the original images that generated the pixel data 905 (e.g., higher resolution than VGA resolution), though that may not always be the case. In some cases, the resolutions of the red-only, green-only, and blue-only images might be the same as the original images that generated the pixel data 905 (e.g., perhaps VGA 640× 480 resolution i.e. "sparse" resolution or perhaps SXGA 1280×960 resolution). Typically, the resolution of the red-only, green-only, and blue-only images will be higher than the resolution of the original camera images due to the stacking effect of the temporal filtering process.

The embodiments are able to use the red-only image 945, the green-only image 950, the blue-only image 955, and optionally the monochrome image 960 to then generate a high resolution output (full) color image 965. That is, the color and texture information from those respective images can be merged together to generate the high resolution output color image 965.

In scenarios where there is missing color data, such as perhaps where there is a lack of pixel data 905 for certain areas of the environment or scene (e.g., voids or gaps in the resulting red-only, green-only, or blue-only images), the embodiments can perform bilateral interpolation 970 to fill in the missing areas with color data. The bilateral interpolation 970 can be performed on any one or more of the red-only image 945, the green-only image 950, the blue-only image 955, the monochrome image 960, or even the high resolution output color image 965.

In one scenario, the monochrome image 960 can be used as an index or perhaps as a frame of reference to help clarify points of texture or boundary information when combining the color images. By using the monochrome image 960 for the merging process to create the high resolution output color image 965, the monochrome image 960 can also be used to enhance the resulting texture or intensity in the high resolution output color image 965.

The motion model 920 can perform the various combination processes in the RGB color space or, alternatively, in the HSI (hue, saturation, intensity) space. That is, the color data can be used to populate the H and S channels while the monochrome image 960 can be used to populate the I channel. Accordingly, different techniques are available for combining the color data.

Figure 10:
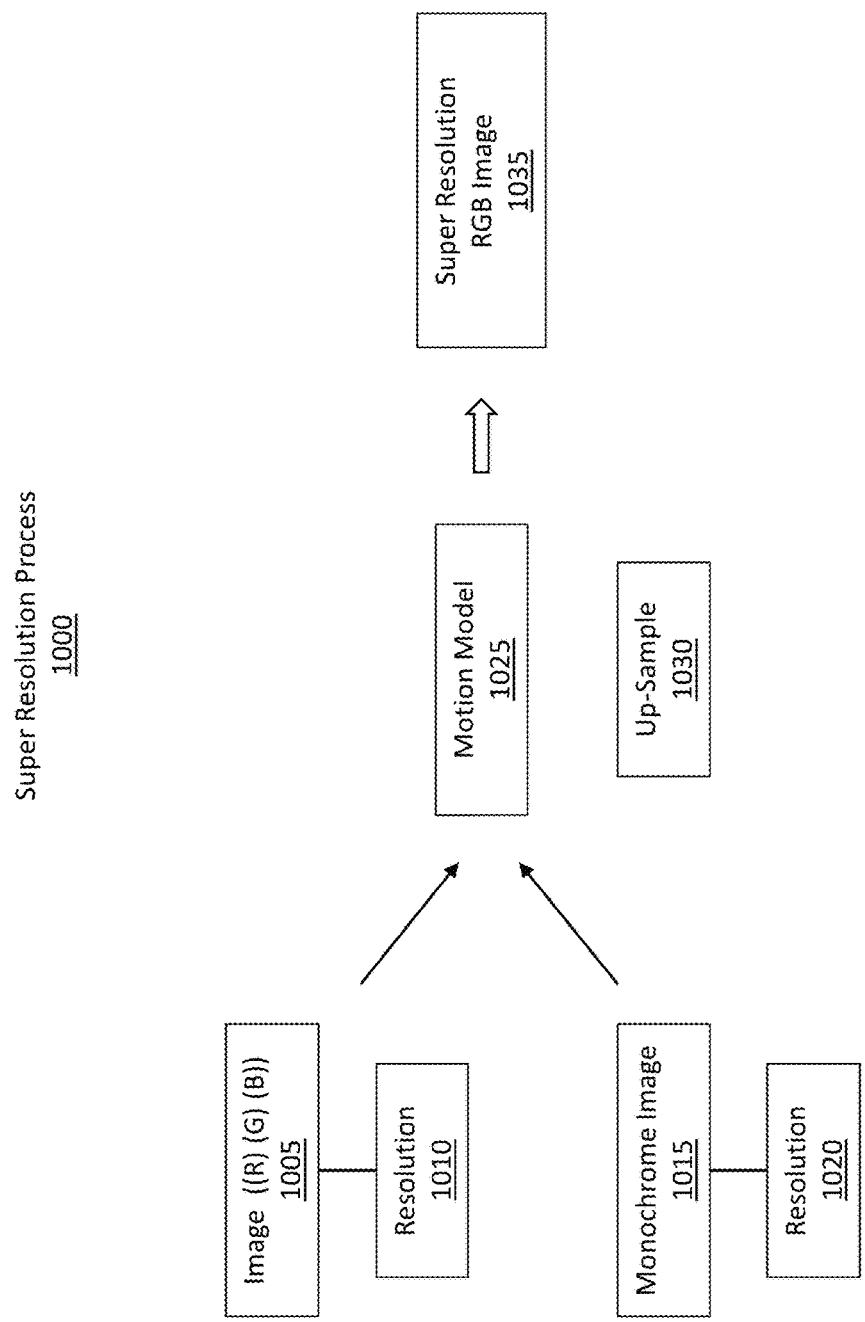
FIG. 10 illustrates how a super resolution RGB image can be generated.

FIG. 10 shows an example super resolution process 1000 where an output image having super resolution (e.g., "2560× 2048" resolution or perhaps "2K" resolution or perhaps "full HD" and above) can be generated from lower resolution input images (e.g., perhaps VGA 640×480 resolution or perhaps SXGA 1280×960 resolution). Although the disclosure has explicitly called out certain resolutions (e.g., VGA, SXGA, or super resolution), one will appreciate how other resolutions can be used as well. Such examples include, but are not limited to, MCGA, QVGA, VGA, Super VGA, XGA, SXGA, UXGA, full HD, 2K, 4K, 8K, 16K, and so on without limit. As mentioned earlier, as used herein, "super resolution" refers to any resolution that includes or is higher than full HD. As used herein, "sparse resolution" refers to any resolution that includes or is lower than SXGA.

Initially, the super resolution process 1000 includes acquiring an image 1005 (e.g., such as the red-only, green-only, or blue-only images mentioned earlier). This image 1005 has a particular resolution 1010. In some cases, the resolution 1010 is considered sparse. In some cases, the resolution 1010 is higher than the sparse resolution of the initial camera images. Notably, the resolution 1010 is lower than the resolution of a monochrome image.

Additionally, the super resolution process 1000 includes acquiring a monochrome image 1015 (e.g., monochrome image 960). Because of the increased number of monochrome pixels, the resulting monochrome image 1015 will have a relatively higher resolution 1020. In some cases, this relatively higher resolution 1020 (as compared to the resolution 1010) is a super resolution (e.g., 2560×2048 resolution).

In accordance with the disclosed principles, the image 1005 and the monochrome image 1015 are fed as inputs into the motion model 1025. The image 1005 is then up-sampled or interpolated (e.g., as shown by up-sample 1030) to cause the resolution 1010 of the image 1005 to match the resolution 1020 of the monochrome image 1015. In some cases, the up-sample 1030 can be a bilateral up-sampling process. This process can be performed on all of the red-only, green-only, and blue-only images.

With the image 1005 (e.g., the red-only, green-only, and blue-only images) now having a higher resolution, the embodiments can then combine that image with the other up-sampled images (i.e. combine all of the red-only, green-only, and blue-only images) to generate a super resolution RGB image 1035, which has at least the resolution 1020 of the monochrome image 1015. That is, all of the red-only, green-only, and blue-only images can be up-sampled and can then be combined or merged with one another to generate the super resolution RGB image 1035. Further details on this process with be provided later when the method flowcharts are presented.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
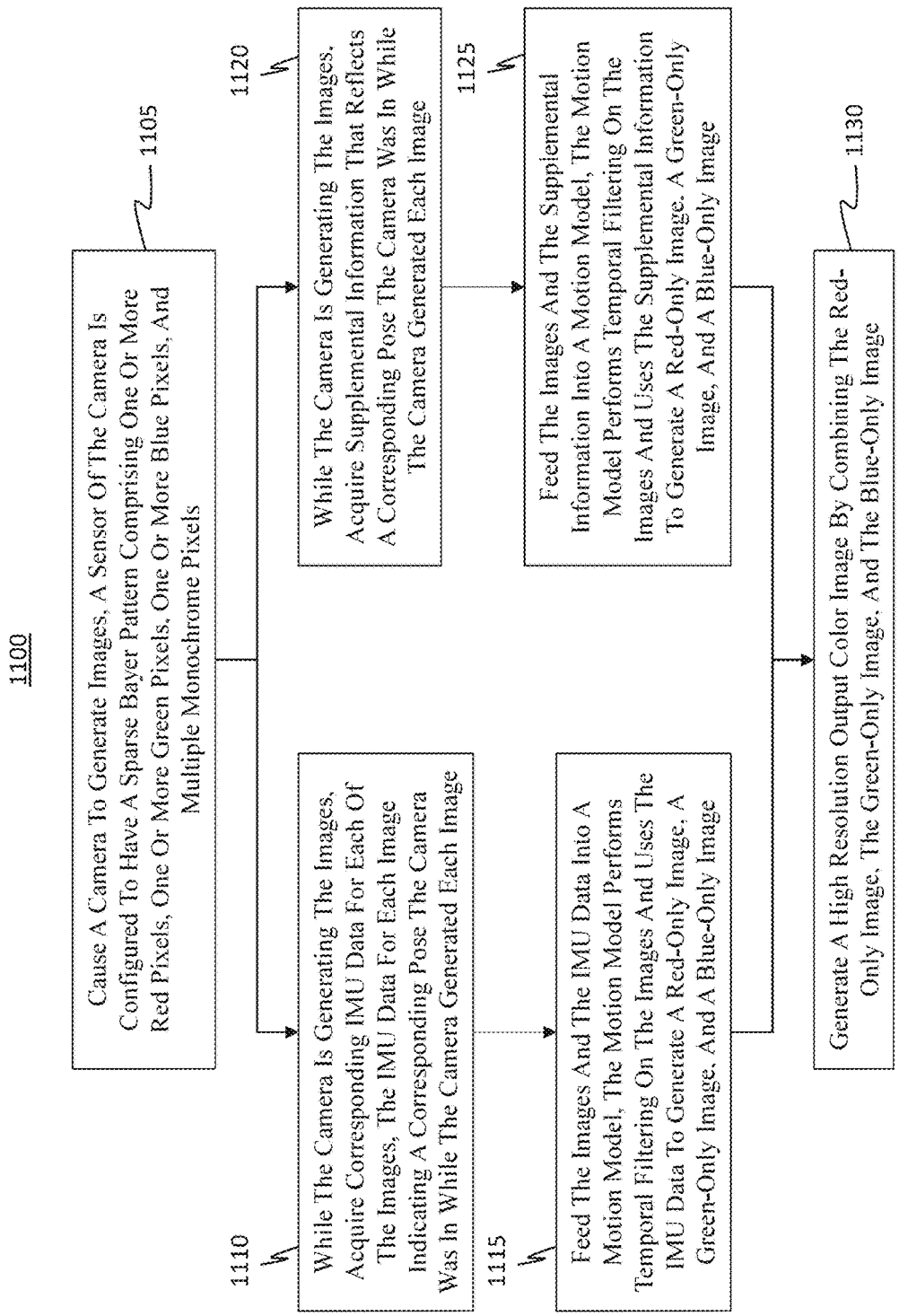
FIG. 11 illustrates a flowchart of an example process for generating a high resolution output image using motion data.

FIG. 11 shows a flowchart of an example method 1100 for using motion data to generate a high resolution output color image from a plurality of images having sparse color information. Method 1100 can be implemented in the architecture 900 of FIG. 9.

Initially, method 1100 includes an act (act 1105) of causing a camera to generate images. Here, a sensor of the camera is configured to have a sparse Bayer pattern comprising one or more red pixels, one or more green pixels, one or more blue pixels, and a plurality of monochrome pixels. Notably, each of the images includes sparse color data and sparse intensity data. Furthermore, an exposure setting of the camera remains unchanged while the camera generates the images.

While the camera is generating the images, act 1110 includes acquiring corresponding inertial measurement unit (IMU) data for each of the images. Consequently, a plurality of IMU data is also generated. The IMU data for each image indicates a corresponding pose the camera was in while the camera generated each image.

In act 1115, the embodiments feed the images and the IMU data into a motion model. The motion model performs temporal filtering on the images and uses the IMU data to generate a red-only image, a green-only image, and a blue-only image.

Figure 12:
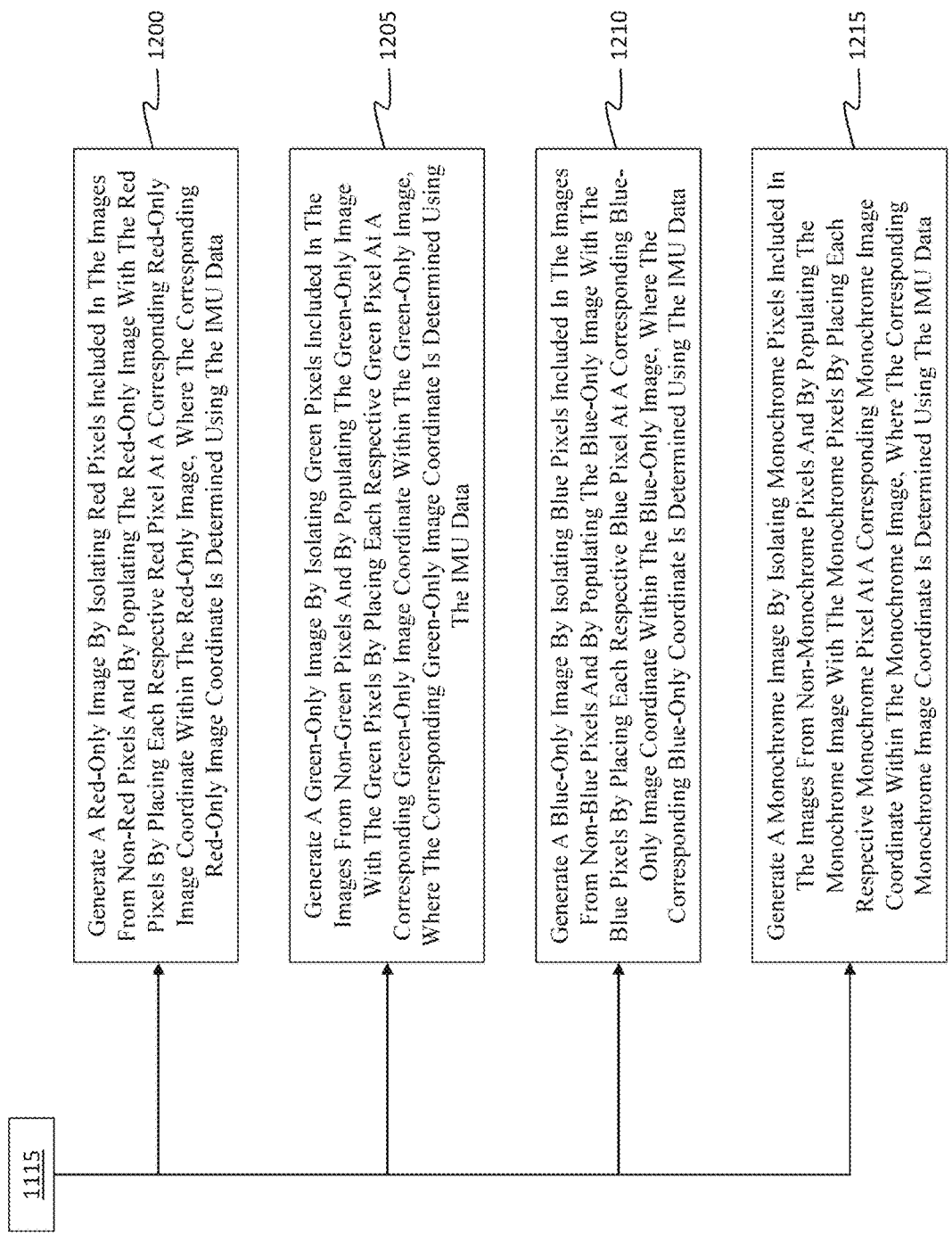
FIG. 12 illustrates how various different images can be generated.

Act 1115, which involves feeding the images and IMU data into a motion model, can include a number of sub-steps. For instance, to implement act 1115, the motion model can be configured to perform the operations outlined in FIG. 12. For instance, act 1115 can include acts 1200, 1205, 1210, and 1215.

Act 1200 includes generating a red-only image by isolating red pixels included in the images from non-red pixels. Act 1200 further involves populating the red-only image with the red pixels by placing each respective red pixel at a corresponding red-only image coordinate within the red-only image. Notably, the corresponding red-only image coordinate is determined using the IMU data.

Act 1205 includes generating a green-only image by isolating green pixels included in the images from non-green pixels. Act 1205 further involves populating the green-only image with the green pixels by placing each respective green pixel at a corresponding green-only image coordinate within the green-only image. The corresponding green-only image coordinate is determined using the IMU data.

Act 1210 includes generating a blue-only image by isolating blue pixels included in the images from non-blue pixels. Act 1210 further includes populating the blue-only image with the blue pixels by placing each respective blue pixel at a corresponding blue-only image coordinate within the blue-only image. The corresponding blue-only image coordinate is determined using the IMU data.

Act 1215 includes generating a monochrome image by isolating monochrome pixels included in the images from non-monochrome pixels. Act 1215 further includes populating the monochrome image with the monochrome pixels by placing each respective monochrome pixel at a corresponding monochrome image coordinate within the monochrome image. The corresponding monochrome image coordinate is determined using the IMU data.

The resolutions of the red-only, green-only, blue-only, and monochrome images can optionally be higher than the resolutions of the original images that generated the pixel data. In some cases, the resolution of the monochrome image is higher than any of the other images.

As alternatives to acts 1110 and 1115, method 1100 can include acts 1120 and 1125. That is, while the camera is generating the images, act 1120 includes acquiring supplemental information that reflects a corresponding pose the camera was in while the camera generated each image. This supplemental information can include the image correspondences (i.e. detected feature points) mentioned earlier.

Act 1125 involves feeding the images and the supplemental information into a motion model. The motion model performs temporal filtering on the images and uses the supplemental information to generate a red-only image, a green-only image, and a blue-only image.

Act 1130 then involves generating a high resolution output color image by combining the red-only image, the green-only image, and the blue-only image. In some cases, the high resolution output color image is generated by merging intensities provided by the monochrome image with colors provided by the red-only image, the green-only image, and the blue-only image. Optionally, an intensity of the high resolution output color image can be higher than an intensity of any of the red-only image, the green-only image, or the blue-only image. The process of combining the red-only image, the green-only image, and the blue-only image can be performed by merging red pixels from the red-only image with corresponding green pixels from the green-only image and with corresponding blue pixels from the blue-only image.

Figure 13:
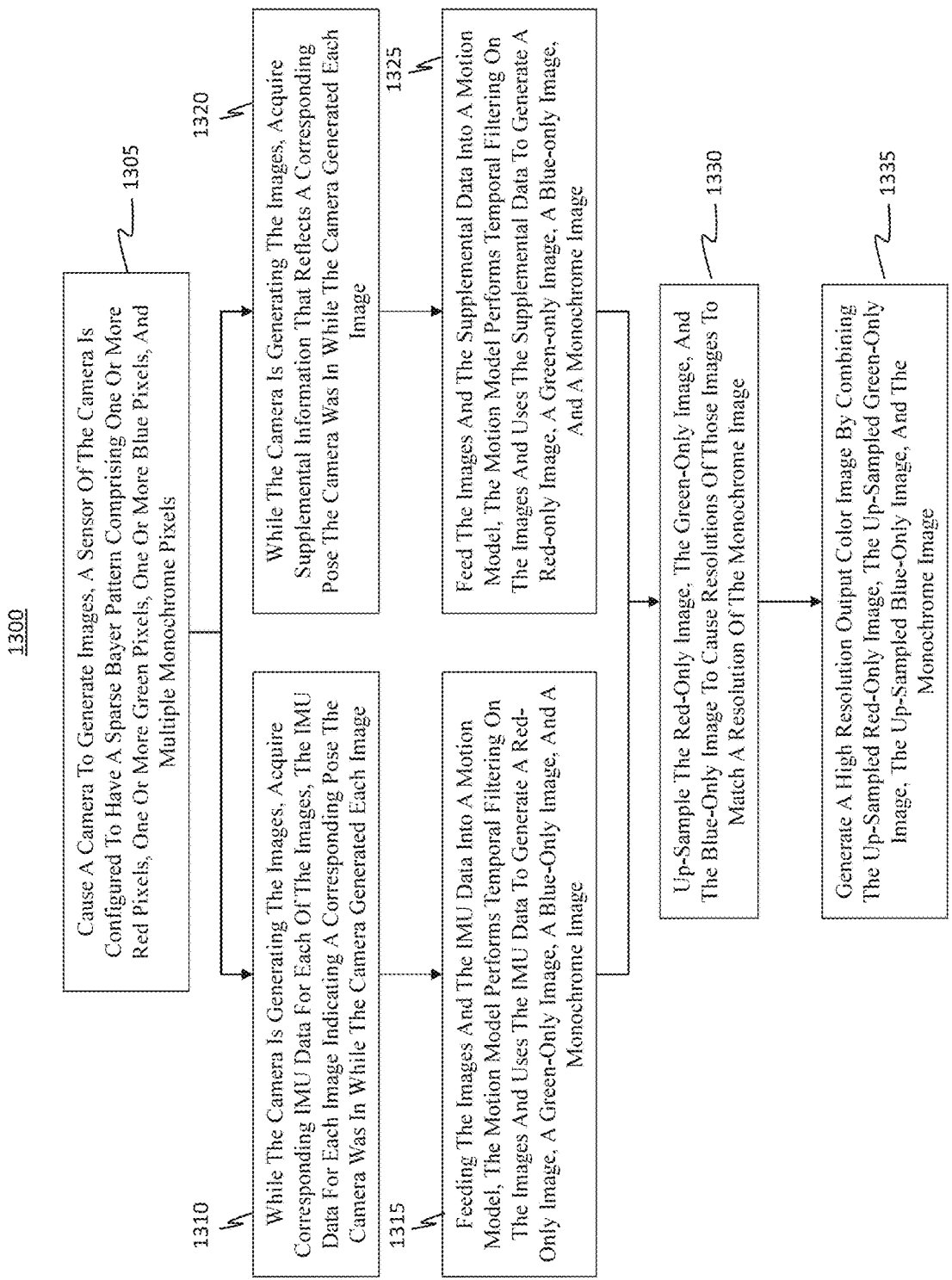
FIG. 13 illustrates another flowchart of an example process for generating a super high resolution output image.

FIG. 13 illustrates a flowchart of an example method 1300 for generating a high resolution full color output image from lower resolution sparse color input images. Method 1300 can be performed using the architecture 900 of FIG. 9. Method 1300 is somewhat similar to method 1100, but method 1300 includes a few different operations in order to generate a super resolution full color output image. These additional operations generally involve various different up-sampling techniques.

Similar to method 1100, there is an act (act 1305) of causing a camera to generate multiple images. Here, a sensor of the camera is configured to have a sparse Bayer pattern. In some cases, the number of monochrome pixels can be more than a sum of the red, green, or blue pixels. Each of these images includes sparse color data and sparse intensity data. Furthermore, an exposure setting of the camera remains unchanged while the camera generates these images. In some cases, the camera can be a low light camera; consequently, the images can be multiple low light images.

While the camera is generating the images, act 1310 includes acquiring corresponding inertial measurement unit (IMU) data for each of the images. Consequently, a plurality of IMU data is also generated. The IMU data for each image indicates a corresponding pose the camera was in while the camera generated that respective image. That is, the IMU tracks different locations of the camera sensor over the period of time.

In act 1315, the embodiments feed the images and the IMU data into a motion model. The motion model performs temporal filtering on the images and uses the IMU data to generate a red-only image, a green-only image, a blue-only image, and a monochrome image.

As alternatives to acts 1310 and 1315, method 1300 can include acts 1320 and 1325. For instance, while the camera is generating the images, act 1320 includes acquiring "supplemental information" that reflects a corresponding pose the camera was in while the camera generated each image. Here, the supplemental information can optionally include image correspondences.

Act 1325 then involves feeding the images and the supplemental data into a motion model. The motion model performs temporal filtering on the images and uses the supplemental data to generate a red-only image, a green-only image, a blue-only image, and a monochrome image. In some cases, bilateral interpolation is performed on one or more of the red-only image, the green-only image, or the blue-only image to fill in areas that are missing color data (i.e. fill in missing color information).

Act 1330 includes up-sampling the red-only image, the green-only image, and the blue-only image to cause a first resolution of the red-only image, a second resolution of the green-only image, and a third resolution of the blue-only image to match a fourth resolution of the monochrome image. In some cases, prior to up-sampling the red-only, green-only, and blue-only images, the monochrome image might also be up-sampled or interpolated to increase the resolution of the monochrome image. The up-sampling can be bilateral up-sampling.

In act 1335, the embodiments generate a high resolution output color image by combining the up-sampled red-only image, the up-sampled green-only image, the up-sampled blue-only image, and the monochrome image. A resulting resolution of the high resolution output color image is higher than any of the first, second, or third resolutions. In some cases, the first, second, and/or third resolutions might be 1280×1024. Optionally, the first, second, and/or third resolutions might be a fraction of a full resolution of the sensor of the camera. For instance, the fraction might be ¼ or perhaps ⅑ (or perhaps between ¼ and ⅑) of the camera sensor's resolution. In some cases, the resulting resolution of the high resolution output color image might be 2560×2048.

The process of generating the red-only image, the green-only image, and the blue-only image can be performed using temporal filtering. That is, multiple images are acquired over time, and then data is selectively merged with one another to generate a new image (i.e. the process of motion compensated temporal filtering). Having generated these various images, the embodiments can then generate the high resolution output color image. This image can be generated by merging the intensities provided by the monochrome image with colors provided by the red-only image, the green-only image, and the blue-only image.

In performing the disclosed operations, the embodiments provide improved image quality to a user. As a result, the user's experience in interacting with the computer system will be enhanced.

Example Computer/Computer Systems

Figure 14:
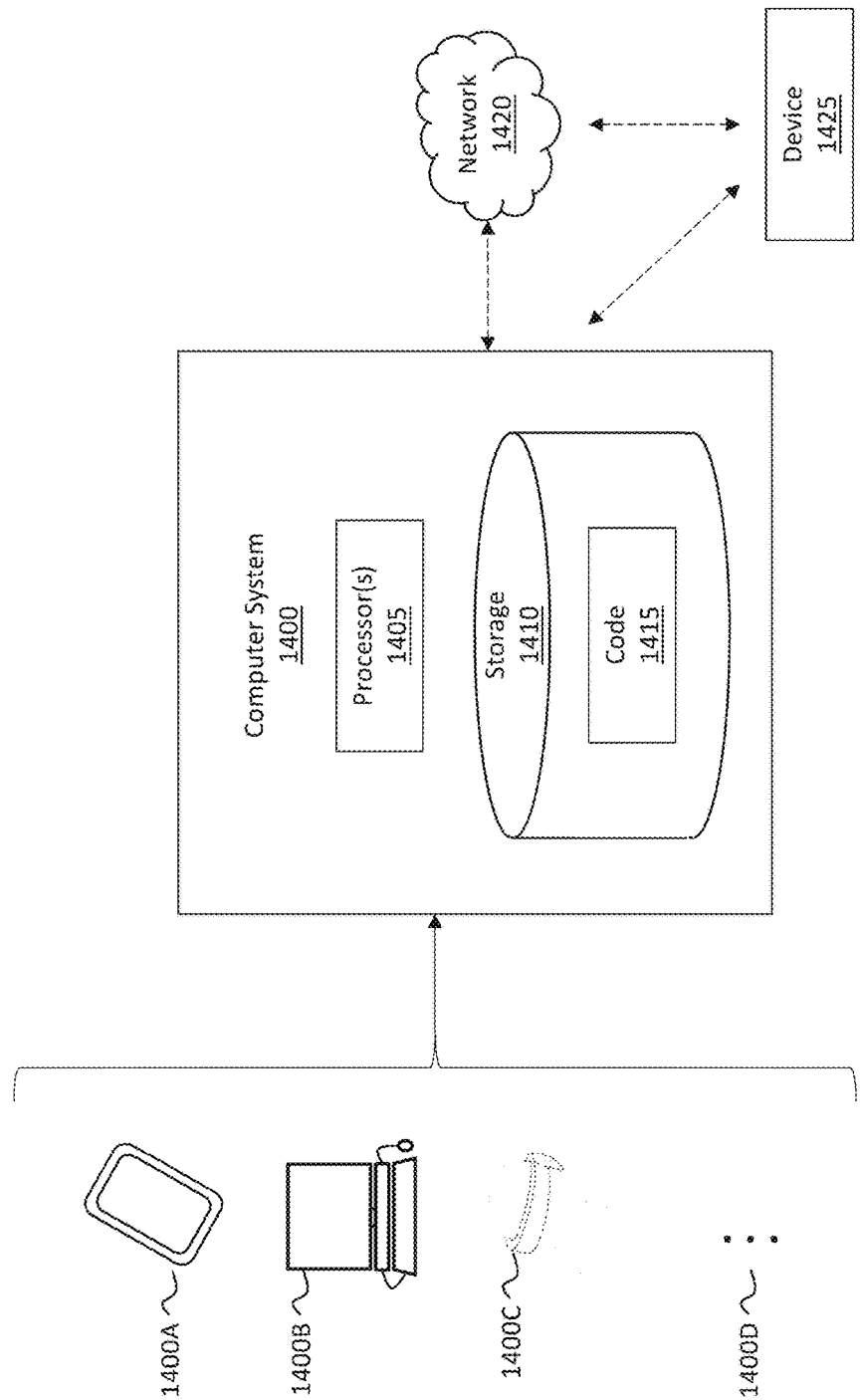
FIG. 14 illustrates an example computer system that may be configured to perform any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet 1400A, a desktop or a laptop 1400B, a wearable device 1400C, a mobile device, or any other standalone device, as represented by the ellipsis 1400D. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit") and storage 1410.

Regarding the processor(s) 1405, it will be appreciated that the functionality described herein can be performed, at least in part, by one or more hardware logic components (e.g., the processor(s) 1405). For example, and without limitation, illustrative types of hardware logic components/ processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "model," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage 1410 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1410 is shown as including executable instructions (i.e. code 1415). The executable instructions represent instructions that are executable by the processor(s) 1405 of computer system 1400 to perform the disclosed operations, such as those described in the various methods.

The disclosed embodiments may comprise or utilize a special-purpose or general-purpose computer including computer hardware, such as, for example, one or more processors (such as processor(s) 1405) and system memory (such as storage 1410), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices (e.g., device 1425) or cloud services to obtain or process data. In some cases, network 1420 may itself be a cloud network. Furthermore, computer system 1400 may also be connected through one or more wired or wireless networks 1420 to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating a high resolution full color image from lower resolution sparse color images, said method comprising:
    filtering multiple sparse color images, wherein filtering the multiple sparse color images results in generation of a red-only image, a green-only image, a blue-only image, and a monochrome image;
    up-sampling the red-only image, the green-only image, and the blue-only image to cause (i) a first resolution of the red-only image, (ii) a second resolution of the green-only image, and (iii) a third resolution of the blue-only image to match a fourth resolution of the monochrome image; and
    generating a high resolution color image by combining the up-sampled red-only image, the up-sampled green-only image, the up-sampled blue-only image, and the monochrome image.

2. The method of claim 1, wherein the multiple sparse color images have resolutions that include or that are lower than super extended graphics array (SXGA).

3. The method of claim 1, wherein the multiple sparse color images are generated by one or more camera sensors that detected less than 1 photon per image.

4. The method of claim 1, wherein the multiple sparse color images are generated by a camera sensor having a sparse Bayer pattern.

5. The method of claim 1, wherein said filtering is performed using a motion model that isolates red, green, blue, and texture pixel data from the multiple sparse color images.

6. The method of claim 1, wherein one or more camera sensors generated the multiple sparse color images, and wherein the one or more camera sensors moved while the multiple sparse color images were generated such that the multiple sparse color images reflect different views of a same environment.

7. The method of claim 6, wherein motion data for the one or more camera sensors is acquired, and wherein the motion data is used to compensate for movement of the one or more camera sensors.

8. The method of claim 7, wherein compensating for the movement includes modifying poses that are reflected in the multiple sparse color images to a common pose.

9. The method of claim 1, wherein generating the red-only image includes stacking multiple images on top of one another and combining data from those images.

10. The method of claim 1, wherein generating the red-only image includes performing a temporal filtering process.

11. A computer system that generates a high resolution full color image from lower resolution sparse color images, said computer system comprising:
    at least one processor; and
    at least one hardware storage device that stores instructions that are executable by the at least one processor to cause the computer system to:
        filter multiple sparse color images, wherein filtering the multiple sparse color images results in generation of a red-only image, a green-only image, a blue-only image, and a monochrome image;
        up-sample the red-only image, the green-only image, and the blue-only image to cause (i) a first resolution of the red-only image, (ii) a second resolution of the green-only image, and (iii) a third resolution of the blue-only image to match a fourth resolution of the monochrome image; and
        generate a high resolution color image by combining the up-sampled red-only image, the up-sampled green-only image, the up-sampled blue-only image, and the monochrome image.

12. The computer system of claim 11, wherein the computer system includes one or more camera sensors that generate the multiple sparse color images or, alternatively, the computer system is a cloud device that accesses the multiple sparse color images.

13. The computer system of claim 11, wherein resolutions of the multiple sparse color images are video graphics array (VGA) resolutions.

14. The computer system of claim 11, wherein a sparseness of the multiple sparse color images occurs as a result of lighting conditions of an environment in which the multiple sparse color images were generated.

15. The computer system of claim 11, wherein filtering the multiple sparse color images is dependent on supplemental information.

16. The computer system of claim 15, wherein the supplemental information includes feature matching data.

17. The computer system of claim 15, wherein the supplemental information includes inertial measurement unit data.

18. The computer system of claim 15, wherein the supplemental information is used to align poses of the multiple sparse color images.

19. The computer system of claim 11, wherein pixel data from the multiple sparse color images is fed into a motion model using different channels for different pixel types.

20. A computer system that generates a high resolution full color image from lower resolution sparse color images, said computer system comprising:
    at least one processor; and
    at least one hardware storage device that stores instructions that are executable by the at least one processor to cause the computer system to:
        filter multiple sparse color images, wherein filtering the multiple sparse color images results in generation of a first color image, a second color image, a third color image, and a monochrome image;
        up-sample the first color image, the second color image, and the third color image to cause (i) a first resolution of the first color image, (ii) a second resolution of the second color image, and (iii) a third resolution of the third color image to match a fourth resolution of the monochrome image; and
        generate a high resolution color image by combining the up-sampled first color image, the up-sampled second color image, the up-sampled third color image, and the monochrome image.

* * * * *